Feb. 21, 1950
M. RIDER
2,498,134
LIGHT REFLECTING BICYCLE PEDAL
Filed Dec. 21, 1944
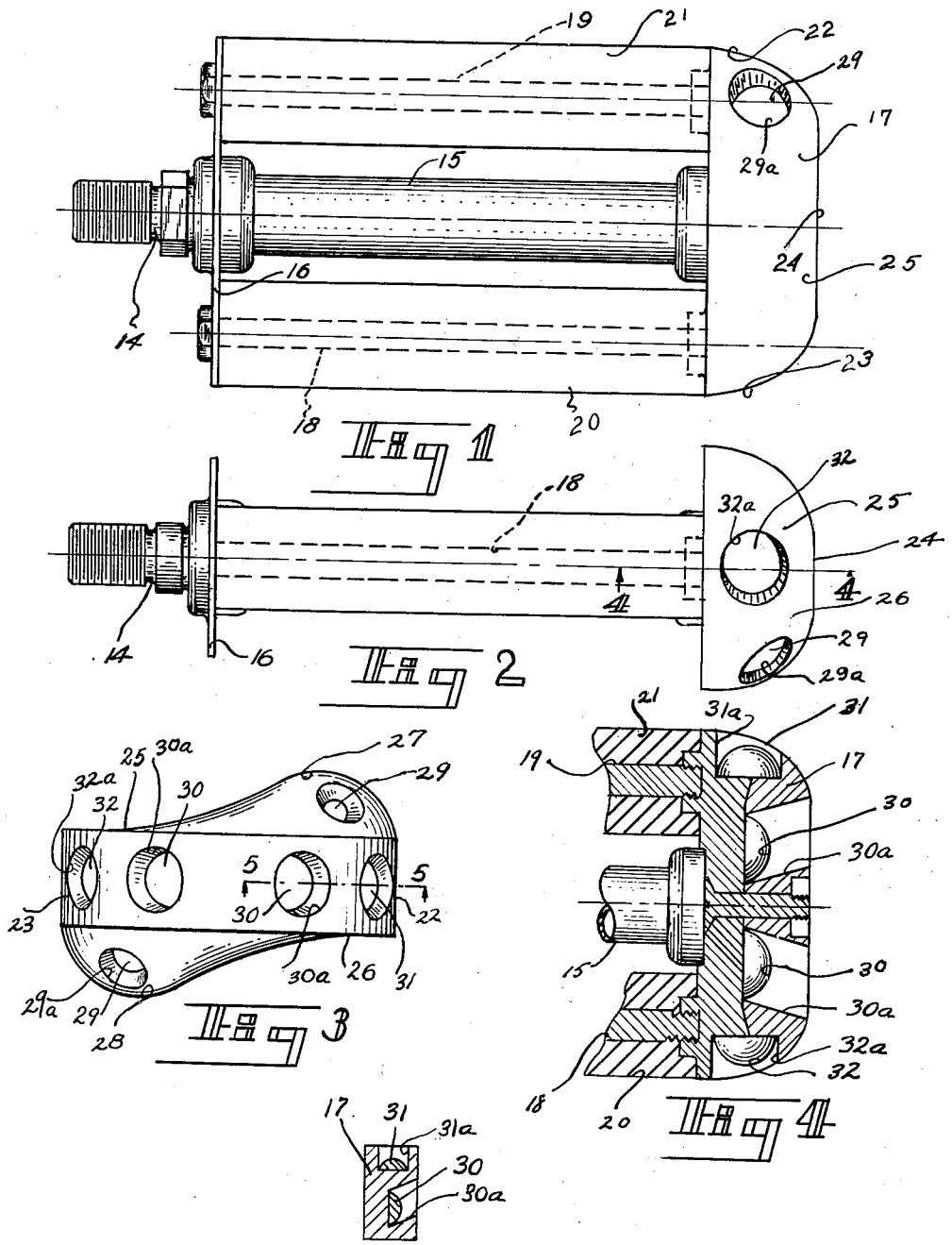
INVENTOR.
MORRIS RIDER
BY
HIS ATTORNEY Patented Feb. 21, 1950

2,498,134

UNITED STATES PATENT OFFICE 2,498,134

LIGHT REFLECTING BICYCLE PEDAL

Morris Rider, Detroit, Mich.

Application December 21, 1944, Serial No. 569,236

1 Claim. (Cl. 88—81)

My invention relates to a new and useful improvement in a bicycle pedal and has for its object the provision of a bicycle pedal so constructed and arranged that a plurality of members carried by the bicycle pedal may serve to reflect light striking the pedal from the front, rear or side regardless of the position of the pedal in its orbit revolution on the pedal arm and regardless of the position of the rotation of the pedal on its axis of mounting.

It is another object of the invention to provide in a bicycle pedal having an outer transverse bar, a plurality of reflecting members mounted on the outer face thereof, positioned at various angles of inclination relative to the outward face to facilitate reflection of light rays striking the same.

It is another object of the present invention to provide a bicycle pedal having a cross bar with opposite side faces and having in each of said opposite faces a reflecting member, one of said members being positioned at an angle to reflect toward one side of the end face and the other being positioned to reflect toward the opposite side of the opposite end face.

Another object of the invention is the provision in a bicycle pedal of a plurality of reflecting members so mounted that at least one of said reflecting members will reflect light rays striking said pedal regardless of the position of rotation of the pedal on its axis.

Another object of the invention is the provision of a bicycle pedal having an end bar provided with a plurality of reflecting members so mounted that at least one of said reflecting members will serve to reflect light rays striking against the cross bar at either of the side faces or the outer face thereof regardless of the angle.

Another object of the invention is the provision in a bicycle pedal having an outer cross bar of a plurality of reflecting members at opposite ends of said cross bar so constructed and arranged that at least one of said reflecting members will serve to reflect light rays striking the end face of said cross bar regardless of the position of rotation of the bicycle pedal on its axis of mounting.

Another object of the invention is the provision in a bicycle pedal having an outer cross bar of at least a pair of reflecting members at opposite ends of said cross bar, one of said reflecting members being mounted on an end face of the cross bar and another reflecting member being mounted on a top and bottom face of the cross bar.

Another object of the invention is the provision in a bicycle pedal having a cross bar provided with a center face and a pair of oppositely disposed end faces of a plurality of reflecting members mounted in the outer face for reflecting, at different angles, light rays striking against the same and a reflecting member in each of said end faces for reflecting light rays therefrom, the relative location of said reflecting members and the angle of incidence of the light rays being such that, in the movement of the light rays from the end face to the side faces or vice versa, the reflector in one of the side faces will pick up and reflect the light rays before the light ray has left the reflector in an adjacent face.

Another object of the invention is the provision in a bicycle pedal having an outer cross bar with oppositely disposed end faces, an upper face and a lower face, of reflecting members mounted in each of said faces in such angulation to the faces and in such position relative to each other, that light rays directed against the upper or lower face of the cross bar will be reflected by the reflectors and picked up by one reflector before another reflector moves out of reflective position relative to the light ray upon rotation of the pedal on its axis of mounting.

Another object of the invention is the provision of a bicycle pedal having an outer cross bar provided with an outer face, oppositely disposed end faces, and a top and bottom face, so constructed and arranged that light may be reflected from the outer bar of the pedal within a range greater than 180° of incidence and regardless of the position of rotation of the pedal on its axis of mounting.

Other objects will appear hereinafter.

It is recognized that various modifications and changes may be made in the detail of structure illustrated and it is intended that such variations and modifications as may be encompassed within the scope of the claim forming a part hereof shall be embraced within the present invention.

Forming a part of this specification are drawings in which,

Fig. 1 is a plan view of a pedal embodying the invention;

Fig. 2 is a side elevational view of a pedal embodying the invention;

Fig. 3 is an end elevational view of a pedal embodying the invention;

Fig. 4 is a fragmentary sectional view taken on line 4—4 of Fig. 2;

Fig. 5 is a sectional view taken on line 5—5 of Fig. 3.

As shown in the drawings, the invention is used with a bicycle pedal of substantially the usual type of construction in which a shaft 14 is used, this shaft 14 being attached to a sprocket arm. A sleeve 15 is provided with an inner cross bar 16, this sleeve 15 being rotatably mounted on shaft 14. Sleeve 15 has an outer cross bar or end bar 17 which is connected to the inner cross bar 16 by stay bolts 18 and 19 which are projected through tread members 20 and 21, generally formed from rubber.

The invention centers around the outer cross bar or end bar 17. This outer cross bar is provided with oppositely disposed end faces 22 and 23, the outer face 24, the top face 25 and the bottom face 26.

At one end cross bar 17 is provided on its upper face with the boss or enlargement 27 and a similar boss or enlargement 28 projects outwardly from the lower face 26 at the opposite end of the bar 17. Positioned in each of these bosses 27 and 28 is a reflecting member 29 which may be in the nature of a convex lens or the like. This lens is so positioned as to normally reflect light rays striking it outwardly toward the outer face 24 and outwardly toward end face 22 and 23. Thus it is obvious that the reflecting member is disposed in tilted relation to the adjacent end face 22 or 23 adjacent to which it is mounted and also tilted relatively to the outer face 24, the angle of tilt being preferably about 15°.

Mounted in each of the end faces 22 and 23 is a light reflecting member which may also be in the nature of a convex lens. This reflecting member 31 or 32 is tilted outwardly toward the outer face 24 and upwardly of the adjacent boss 27 or 28.

Mounted in the outer face 24 is a plurality of reflecting members and in the present embodiment, I have shown a pair of these reflecting members 30. Each of these reflecting members is positioned in angulation or tilted relative to the outer face 24, one of these members 30 being tilted outwardly toward the end face 22 and the one member 30 being tilted toward the end face 23.

These lenses are all shown as mounted in recesses, the various recesses being indicated by the same numeral as the lenses with the letter "a" added.

In other words, the construction of these reflecting members is such that when light rays strike the end face of the cross bar 17, they will be reflected from the lens 29 the lenses 31 and 32 and the relative location is such that as the pedal is rotated on the axis of the shaft 14, which is the axis of mounting of the pedal, the lens 29 at one end of the cross bar 17 will not move out of the field of light until the adjacent lens 31 or 32 is moved into the field of light. Likewise, the lens 31 or 32 will not move out of the field of light until one of the lenses 29 is moved into the field of light. In the normal use of a bicycle, the pedal, of course, would not be rotated but would be rocked on its axis.

The angulation is such and the shape of the reflecting members is such that when the light rays are directed against the cross bar 17, the reflecting members will function whether this light proceeds from a source at either side of the pedal, or outwardly of the outer face 24, the range being in excess of 180°.

Similarly, there is a coordination between the lenses 30 and the lens 31 and 32 when the pedal is rotated on an axis extended vertically through Fig. 2 and light rays are permitted to strike the cross bar 17, the lens 30 could not pass out of the field of light until either the lens 31 or 32 move into the field of light and this is so while the pedal is being rotated through an arc in excess of 180°.

Thus, I have constructed a bicycle pedal so arranged that a person riding a bicycle is provided with a means whereby lights striking the bicycle from front, rear or side, within the ranges specified, may be reflected from the bicycle pedal and thus indicate the presence of the bicycle. This is believed particularly useful in avoiding accidents as the light rays would thus be reflected from the bicycle and apprise an automobile driver of the presence of the bicycle.

It is believed obvious that other means of reflecting light may be resorted to, other than the buttons or convex lenses to which I have made reference. As long as the faces referred to are provided with reflectors at the locations indicated and with the relative angulation referred to, the results enumerated may be obtained. For instance, the outer faces themselves may be provided with a reflecting coating instead of providing the convex reflecting members.

It will be noted that whether the light proceeds from above or below, from the front, the rear, or either side, the reflective characteristics are present and thus a universal reflector as to direction is obtained on such a structure.

It is also believed obvious that direct illumination of the lens from within the cross bar may be effected by mounting a light bulb in such a position that it will reflect light through the openings in the cross bar.

What I claim as new is:

In a bicycle pedal of the class described: an end bar positioned at one of the ends thereof and having an outer face and a pair of oppositely disposed end faces, a top face and a bottom face, there being a pair of recesses formed in said outer face, one of said recesses being inclined outwardly toward one end face and the other of said recesses being inclined outwardly toward the opposite end face, and there being a recess formed in each of said end faces and a reflector mounted in each of said recesses in said outer face and lying with its outer face positioned inwardly from the surface of said outer face, one of said reflectors being positioned to reflect to one end of said outer face and the other being positioned to reflect toward the opposite end of said outer face; and a reflector mounted in each of said recesses in said end faces and lying with its outer face positioned inwardly from the surface of the end face, one of said reflectors in said end face recesses being positioned to reflect in one direction and the reflector in the recess in the other end face being positioned to reflect in another direction; a boss projecting upwardly from the top face of said bar and having a recess formed therein; and a reflector mounted in said recess and positioned with its outer face positioned inwardly of the outer face of said boss; and a boss projecting downwardly from said bottom face and having a recess formed therein; and a light reflector positioned in said last named recess and positioned with its outer face inwardly of the surface of said boss.

MORRIS RIDER.

REFERENCES CITED

The following references are of record in the file of this patent:

UNITED STATES PATENTS

| Number | Name | Date |
| --- | --- | --- |
| 1,745,163 | Graham | Jan. 28, 1930 |
| 1,823,240 | Cobb | Sept. 15, 1931 |
| 1,835,218 | Holmgreen et al. | Dec. 8, 1931 |
| 2,099,671 | Bairey | Nov. 23, 1937 |
| 2,151,144 | Penny et al. | Mar. 21, 1939 |

FOREIGN PATENTS

| Number | Country | Date |
| --- | --- | --- |
| 256,502 | Great Britain | Aug. 12, 1926 |
| 477,141 | Great Britain | Dec. 22, 1937 |